United States Patent
Chen et al.

(10) Patent No.: US 7,725,202 B2
(45) Date of Patent: May 25, 2010

(54) AUDIO SPLICE PROCESS FOR DIGITAL AD INSERTION

(75) Inventors: Jingyang Chen, San Diego, CA (US); Robert S. Nemiroff, Carlsbad, CA (US)

(73) Assignee: General Instrument Corporation, Horsham, PA (US)

( * ) Notice: Subject to any disclaimer, the term of this patent is extended or adjusted under 35 U.S.C. 154(b) by 733 days.

(21) Appl. No.: 10/744,271

(22) Filed: Dec. 23, 2003

(65) Prior Publication Data
US 2005/0022253 A1    Jan. 27, 2005

Related U.S. Application Data

(60) Provisional application No. 60/489,825, filed on Jul. 24, 2003.

(51) Int. Cl.
G06F 17/00    (2006.01)
H04N 9/74    (2006.01)

(52) U.S. Cl. .................................... 700/94; 348/584

(58) Field of Classification Search ................. 700/94; 348/584; 375/240, 240.12, 240.26, 240.28
See application file for complete search history.

(56) References Cited

U.S. PATENT DOCUMENTS

| | | | |
|---|---|---|---|
| 5,859,660 A * | 1/1999 | Perkins et al. ............... 725/32 |
| 6,038,000 A * | 3/2000 | Hurst, Jr. ............... 375/240.26 |
| 6,181,383 B1 * | 1/2001 | Fox et al. .................... 348/515 |
| 6,282,212 B1 * | 8/2001 | Kitazawa .................... 370/537 |
| 6,330,286 B1 * | 12/2001 | Lyons et al. ........... 375/240.28 |
| 6,785,289 B1 * | 8/2004 | Ward et al. .................. 370/412 |
| 6,806,909 B1 * | 10/2004 | Radha et al. ............. 348/384.1 |
| 6,993,081 B1 * | 1/2006 | Brunheroto et al. .... 375/240.28 |
| 2003/0142689 A1 * | 7/2003 | Haberman et al. .......... 370/429 |
| 2004/0218093 A1 * | 11/2004 | Radha et al. ............. 348/384.1 |
| 2005/0015816 A1 * | 1/2005 | Christofalo et al. ......... 725/136 |

* cited by examiner

Primary Examiner—Xu Mei
Assistant Examiner—Daniel R Sellers
(74) Attorney, Agent, or Firm—Larry T. Cullen

(57) ABSTRACT

A system and method for audio splicing (insertion) of an Ad audio stream in the compressed domain, where variable early delivery of the Ad audio stream and variable bit rate are allowed, without creating audio distortion, glitches, or other digital artefacts or errors, in the resultant audio stream is disclosed. The present system and method provides for a splice delay buffer which delays the first five Ad audio frames until transmission of the last frame of the primary audio stream, but before the splice time. Subsequent Ad audio frames are delayed by a fixed amount, where the fixed amount is greater than the frame delay of the primary audio stream, to allow for ease of splice back to the primary audio stream.

15 Claims, 2 Drawing Sheets

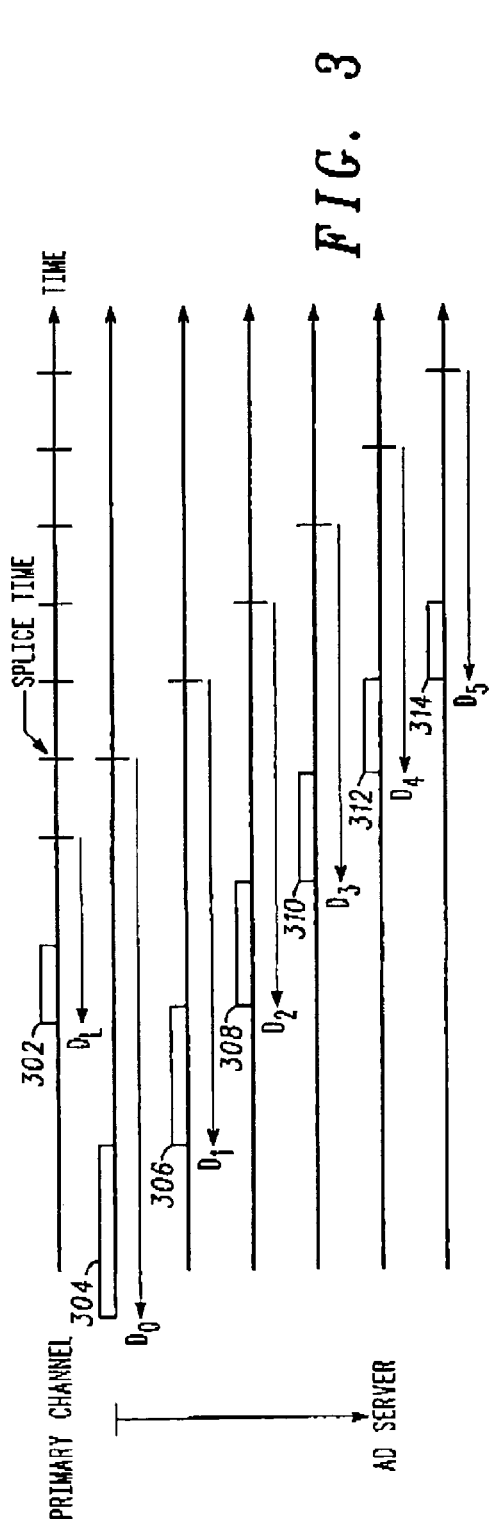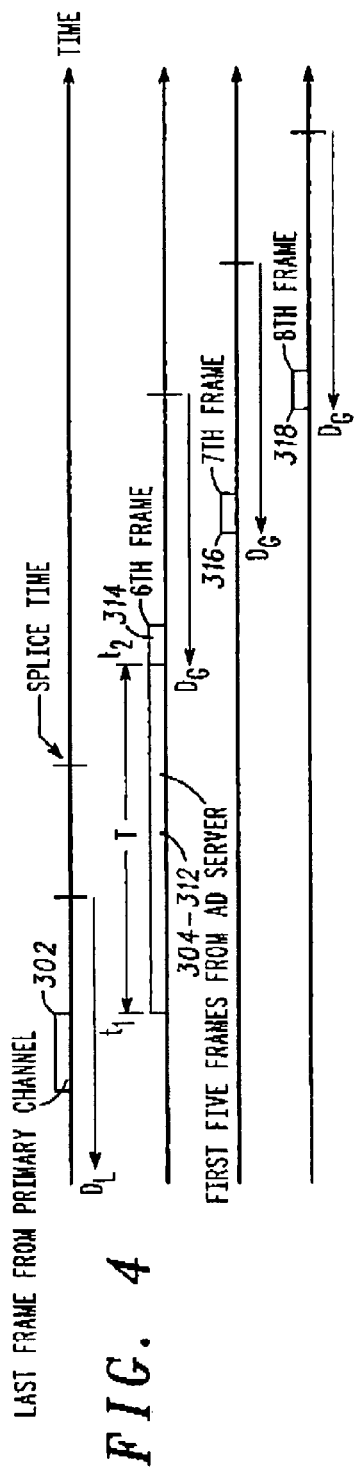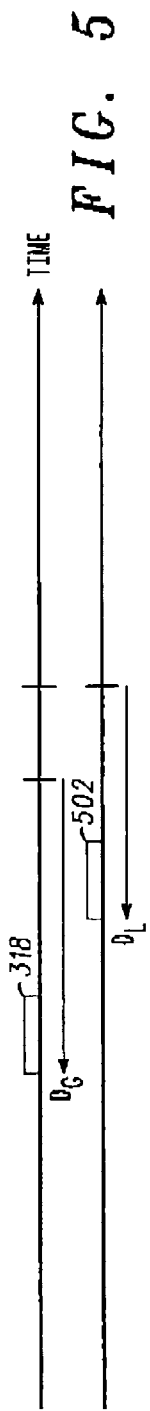

AUDIO SPLICE PROCESS FOR DIGITAL AD INSERTION

CROSS-REFERENCE TO RELATED APPLICATION

This application is related to U.S. Provisional patent application 60/489,825, filed on Jul. 24, 2003, from which priority is claimed, and which is herein incorporated by reference in its entirety.

FIELD OF THE INVENTION

The present invention relates to the processing of digital broadcast signals. More specifically, the present invention relates to the splicing of a second transport stream into a first transport stream to enable the insertion of an advertisement ("Ad"), local program, or the like.

BACKGROUND OF THE INVENTION

Splicing video and audio has been a practice used for decades in the video broadcasting industry. Splicing allows for advertisements, or other locality specific content, to be inserted in the broadcast stream for consumption by a discrete (often regional) audience. With the advent of digital broadcast signals, such splicing has become more complex because digital video and audio streams are conventionally separate and distinct streams, prior to modulation to end users. Further, of the two types of streams (audio and video), audio is the most problematic, as discussed below.

Traditional digital audio splicing is done in the un-compressed domain. Thus, in order to complete an audio insertion process (also referred to as "Ad insertion"), the packets of the primary audio stream must be (1) compressed for transmission, (2) de-compressed at the point where audio insertion of the second audio stream ("Ad audio stream") occurs, and (3) re-encoded and re-compressed, and typically modulated, after Ad insertion for propagation of the resultant signal to a receiver (end-user) device(s).

To alleviate the above-recited inefficient and cumbersome steps, a simple approach to audio splicing in the compressed domain was developed. The approach utilizes an audio decoder buffer, standard in most receiver devices. The audio decoder buffer is given the primary audio stream in normal course from a transcoder-multiplexer (head end equipment) (hereinafter "transmux"). The primary audio stream may be akin to a national feed for a television network, for example. After the transmux transmits the last frame of the primary audio stream needed prior to the Ad insertion, the transmux discontinues sending any of the primary stream. At that point the audio decoder buffer fullness is underflowed, providing a sufficient gap such that when the transmux begins to transmit the Ad audio stream the audio decoder buffer has sufficient temporary storage space to receive it without dropping any packets. The packets are then presented to the end user by the receiver device in accordance with the Presentation Time Stamp ("PTS") (header stamps in the Packetized Elementary Stream ("PES")) in each PES packet header, as is commonly known. After the last packet in the Ad audio stream is transmitted, the transmux begins transmitting the primary stream again.

The above approach, however, is prone to producing unpredictable results such as audio distortion due to the buffer underflow in the audio decoder buffer. In order to avoid the underflow, the Ad server stream must be transmitted to the audio decoder buffer before underflow occurs. However, the Ad audio stream is delivered by the Ad server too early relative to the splice time. Hence, the Ad audio stream reaches the audio decoder buffer before the normal arrival time of the last frame from the primary program, hence too many Ad audio packets reach the audio decoder buffer before the last frame from the primary program has been pulled out and presented to the end users. In this instance, the audio decoder buffer would not have enough space for the Ad audio stream and would overflow and begin dropping packets of the Ad audio stream. Then, when the Ad audio stream is presented to the end-user in accordance with the PTS, the dropped packets will obviously cause all types of undesirable audio distortion.

Unfortunately, this early delivery is quite common in conventional digital broadcast systems. DVS 380, a digital video/broadcast delivery standard, specifies that the Ad audio stream should arrive at the splicer 300 to 600 milliseconds earlier than the splice time (insertion time). The early audio stream delivery forces the Ad server to send the first several frames of the audio stream at a reduced transmission bit rate (slower bandwidth) than the normal audio transmission rate in order to prevent the audio buffer from overflowing. However, this will only prevent the audio buffer from overflowing if the audio buffer is allowed to empty prior to the start of the Ad server audio stream. Unfortunately, the 300 millisecond (or greater) early delivery is too large for a fixed bit rate audio stream if decoder buffer underflow is not allowed prior to the start of the Ad audio stream. For example, an audio stream transmitted at 192 kilobits per second corresponds to a maximum frame transmission delay of 149 milliseconds, given an audio buffer size of 3,584 bytes. A frame transmission delay is defined as the time duration from the transmission time of the current frame to its presentation time. It is also equal to the decoder buffer delay as defined later. Thus, earlier delivery of an Ad audio stream of 300 milliseconds is far above the maximum frame transmission delay and as a result, the audio decoder buffer may overflow. Further, if the Ad audio stream is delayed by a fixed time to avoid the overflow, an underflow may occur, because the start of the audio stream is transmitted too slow. The above described audio decoder buffer underflow and overflow results in audio distortion.

Thus, what is needed is a system and method to eliminate buffer underflow or overflow when an Ad audio stream is delivered at a variable time prior to the insertion time and/or at a variable bit rate.

SUMMARY OF INVENTION

An object of the present invention is to provide for audio splicing (insertion) of an Ad audio stream in the compressed domain, where variable early delivery of the Ad audio stream and variable bit rate are allowed, without creating audio distortion, glitches, or other digital artifacts or errors, in the resultant audio stream.

In order to achieve this objective, as well as others which will become apparent in the disclosure below, the present invention provides for a splice processor which manipulates the audio decoder buffer fullness, in a receiver (end-user) device, to avoid underflow or overflow without repacketizing the audio packets. The present invention also avoids altering the audio decoder buffer fullness of the primary channel after the insertion of the Ad audio stream to avoid accumulative error.

In an exemplary embodiment, the present invention comprises a system and method to establish a target Ad audio stream frame transmission delay ("Ad frame delay") relative to the pre-determined presentation time, and to maintain the target Ad frame delay throughout the Ad. More specifically, the present invention provides for (1) manipulating the audio decoder buffer fullness to avoid underflow or overflow without repacketizing the audio packets; (2) avoiding altering the audio decoder buffer fullness of the primary channel after the insertion to avoid accumulative error; (3) establishing an Ad frame delay at the splice time by buffering the first five frames of the Ad audio stream from the Ad server before the splice time and transmitting them from the delay buffer in a shorter time span; and (4) maintaining the Ad frame delay throughout the transmission of Ad audio stream based upon, in part, the PTS, which will prevent accumulative error and will be fault resilient to bit stream errors.

Thus, the present system and method provides for a splice processor which uses the Ad frame delay to manipulate the audio decoder buffer fullness to avoid underflow or overflow without repacketizing the audio packet, thus avoiding audio distortion.

BRIEF DESCRIPTION OF THE DRAWINGS

For a complete understanding of the present invention and the advantages thereof, reference is now made to the following description taken in conjunction with the accompanying drawings in which like reference numbers indicate like features, components and method steps, and wherein:

FIG. 3 is a detailed timing diagram illustrating the original timing for splicing a second transport stream into a first transport stream;

FIG. 4 is a detailed timing diagram illustrating splice timing for inserting a second transport stream into a first transport stream to enable the insertion of an Ad, local program, or the like, in accordance with an exemplary embodiment of the present invention; and FIG. 5 is a detailed timing diagram illustrating the case of splicing back to the first (primary) transport stream after Ad insertion in accordance with an exemplary embodiment of the present invention.

DESCRIPTION OF A PRESENTLY PREFERRED EMBODIMENT

The following references are hereby incorporated by reference in their entireties: (1) Vincent Liu, "Splice Operation for ASPEN", Jan. 8, 2002; (2) GIC-616, U.S. patent application Ser. No. 09/872,783, "Splice Point Processing in an MPEG-2 Multiplexer"; (3) SCTE DVS380, "Digital Program Insertion Splicing API"; and (4) ISO/IEC JTC1/SC29/WG11 "CODING OF MOVING PICTURES AND ASSOCIATED AUDIO" (a commonly known standard), all of which have been previously filed with U.S. Provisional Patent Application No. 60/489,825.

Although the present invention will be illustrated below primarily in conjunction with MPEG-2 transport streams, the present invention is more broadly applicable to MPEG-2 program streams as well as to packet-based data streams generated in accordance with standards other than MPEG-2. These other standards include asynchronous transfer mode (ATM), transmission control protocol/Internet protocol (TCP/IP), and frame relay. The term "transport stream" or "stream" as used herein should therefore be understood to include both MPEG-2 transport and program streams as well as any packet-based digital data stream which includes video, audio or other types of data, or various combinations thereof. The term "transport packet" or "packet" or "frame" refers to a packet or frame within a transport stream. It should also be recognized that the present invention is suitable for use in a wide variety of transport stream switching applications. For example, the present invention can be readily applied to the simultaneous splicing of several insertion streams into single program transport streams of a given multi-program input transport stream, to the replacement of a subset of the single program streams with corresponding insertion streams, and to numerous other switching applications. The term "splicing" as used herein should therefore be understood to include these and other alternative transport stream switching applications. Finally, it should be noted that the term "frame" as used herein is intended to include pictures, single or multiple fields, progressive or interlaced frames, as well as other suitable arrangements of video and audio data.

Figure 1:
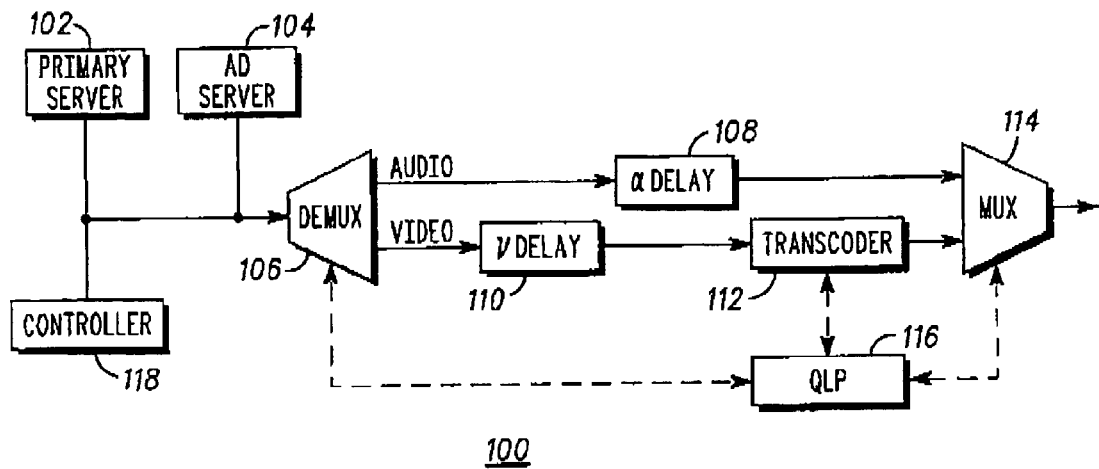
FIG. 1 is an illustration of a transmux system used for demultiplexing, transcoding, and re-multiplexing digital audio and video streams.

It is essential to comprehend the normal progression and propagation of a digital broadcast signal through a transmux to understand of substance of the present invention. Referring to FIG. 1, system 100 is shown. System 100 is a transmux including a demultiplexer 106 which receives signals from a primary server 102. Primary server 102 provides the video and audio digital bit streams for the primary or first stream. For network television, the primary stream would be akin to the national feed. One or more primary servers 102 transmit multiple streams to demultiplexer 106. Using a single stream for purpose of explanation only, when the demultiplexer 106 receives a primary stream it separates the audio stream from the video stream. The video stream first is received in a video delay buffer ("vdelay") 110, which hold video packets for a fixed time for synchronization with the audio stream. Similarly, the audio stream is also received by an audio delay buffer ("adelay") 108, to ensure synchronization with the video stream.

In the adelay 108 and vdelay 110 the PTS time stamps are placed on the audio and video PES headers respectively to ensure proper display on the end-user side. The video stream is then processed by a transcoder 112 which manages the video and adjusts for variable bandwidth and other video parameters as instructed by the quantization level processor ("qlp") 116. Thereafter, the audio and video streams are multiplexed and transmitted to receiver devices, as audio and video packets are received by multiplexer 114.

The audio decoder buffer (not shown) consists of BSn=Bsmux+BSdec+BSoh=3,584 bytes as defined in ISO/IEC JTC1/SC29/WG11 "CODING OF MOVING PICTURES AND ASSOCIATED AUDIO". The access unit is an audio frame and is decoded in the receiver device at the time defined by the PTS. In the case of audio, all PES packet headers that are stored immediately before the access unit or that are embedded within the data of the access unit are removed simultaneously with the removal of the access unit. As the access unit is removed it is instantaneously decoded for presentation to an end-user(s) in a receiver device. The audio decoder buffer delay is defined as the time duration from the time the first byte of the audio frame enters the audio decoder buffer to the time the audio frame is removed. The audio decoder buffer fullness is the occupancy of the audio decoder buffer.

System 100 may also receive secondary streams, such as Ad audio streams, from an Ad server 104. The Ad server 104 monitors DVS380 messages from the Controller 118 which builds the DVS380 messages from the DVS253 messages embedded in the primary stream, which indicate pre-determined times for Ad insertion, also known as splice times. The Ad server 104 may send an Ad audio stream at a splice time, or may let the primary stream continue. For example, a local television network may wish to insert their local advertisements at some splice time opportunities, and at others times not insert, so as to let the national commercials play which are in the primary stream.

If instructed the Ad server 104 will begin sending an Ad audio stream at one of the pre-determined splice times. When the Ad server 104 begins to send its Ad audio stream, demultiplexer 102 discards any primary audio stream packets after the last frame from the primary audio stream, and continues with the Ad audio stream packets after splice time. The last frame of the primary audio stream is the latest frame whose PTS is less than the splice time. (Here, the demultiplexer 102 also rebuilds the last PES packet.)

In the case of a "splice back" from the Ad audio stream to the primary audio stream, the first frame from primary audio stream is the first frame whose PTS is larger than the splice time. (Here, the demultiplexer 102 also rebuilds the first PES packet.).

Further, each audio transport packet is attached with a hardware time tag, preferably in 27 MHz ticks, that indicates the time for the packet to be pulled out the adelay 108. The hardware time tag of a transport packet is initially set to the time it arrives and is modified later if necessary.

The demultiplexer 106, as with the primary stream, separates the video and audio streams of the Ad stream. On the video side, the transcoder 112, and qlp 116 are structured as to perform a seamless splice, even if the video stream arrives earlier than expected and/or at variable bit rates. Thus, the transcoder 112 serves as a video packet manager. However, there is no comparable functionality for the audio stream. Hence, the audio stream is solely dependence on the fixed delay in the adelay 108 to compensate for any early arrival of an Ad audio stream. The adelay 108 delay time serves to ensure that the audio decoder buffer, in a receive device, will not overflow if the audio stream is received prematurely. Since the audio decoder buffer size is limited, there is an upper and lower audio decoder buffer delay threshold. Thus, if the Ad audio stream arrives too early, or at an unexpected rate, the threshold will be exceeded and the audio decoder buffer will overflow or underflow.

Figure 2:
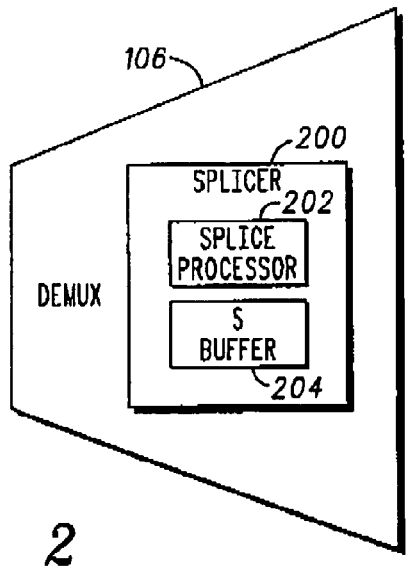
FIG. 2 is an illustration of the inventive splice processor system and method of the present invention, for splicing a second transport stream into a first transport stream to enable the insertion of an Ad, local program, or the like, preferably located in a demultiplexer in accordance with an exemplary embodiment of the present invention.

Referring to FIG. 2, the system and method of the present invention compensate and alleviate the above problem by providing a splicer 200 which includes a splice delay buffer ("sbuffer") 204 and a splice processor 202. The splicer 200 is preferably located in the demultiplexer 106, but may be placed anywhere in the transmux 100 after the Ad stream has been demultiplexed and before the adelay 108. Further, the splice processor 202 and spdelay 204 may be integrated on a single chip.

Referring to FIG. 3, FIG. 3 shows the primary channel (stream) and a "splice time". The last frame 302 of the primary stream prior to the splice time is shown. Here, the Ad server 104 began sending Ad audio frames 304-314 significantly earlier than the splice time. Further, the bit rate of the transmission varies as can be seen by the length of each respective Ad audio frame 304-312. (Note: each frame contains the same quantity of bits.). If each of these Ad audio frames 304-312 were not delayed, the Ad audio stream frames 304-312 would reach the audio decoder buffer prior to the normal arrival time associated with the last packet of the primary stream 302 and cause decoder buffer overflow. If each of these Ad audio frames 304-312 were delayed by a fixed time in the adelay 108 to avoid the overflow, the audio decoder buffer would underflow because the bit rate of the first several frames is too slow. FIG. 3 also illustrates that generally after the fifth frame the Ad server 104 begins to send Ad audio packets at more fixed intervals and bit rate (bandwidth). FIG. 3 also shows the presentation time for each respective Ad audio frame with respect to its arrival time, see D0-D5.

Referring to FIG. 4, due to the conventional audio decoder buffer delay after the transmission of the last packet 302 of the primary stream, in accordance with an exemplary embodiment of the present invention, it is safest to begin transmission (from the demultiplexer 106 to the adelay 108) of the first packets of the Ad audio stream after transmission of the last packet of the primary stream 302, but prior the splice time. Thus, in accordance with an exemplary embodiment of the present invention, the first five frames of the Ad audio stream are delayed in the sbuffer 204, by the splice processor 202, until the last packet of the primary stream 302 is transmitted from the demultiplexer 106. Thereafter, but prior to the splice time, the first five frames 302-314 are transmitted from the demultiplexer 106 to the adelay 108, and subsequently modulated and transmitted to the audio decoder buffer. Thereafter, the remaining Ad audio frames are delayed in the demultiplexer 106 by a fixed amount in the sbuffer 204, then sent to the adelay 108 for subsequent transmission.

More specifically, in FIG. 3, $D_L$ denotes the audio decoder buffer delay of the last audio frame from the primary channel; $D_G$ denotes the target audio decoder buffer delay of the Ad audio frames after the first set of frames; and $D_0$ to $D_5$ denotes the audio decoder buffer delays of the first six frames from the Ad.

In operation, the splice processor 202 places all the packets before and including the last one from the primary program directly into adelay buffer 108, while it delays the earlier delivery of Ad audio frames in the sbuffer 204 until the last packet of the primary program is placed in the adelay buffer 108. The splice processor 202 then transfers the earlier delivered Ad audio frames from the sbuffer 204 into the adelay buffer 108; and it pulls out the first five Ad audio frames from the adelay buffer 108 in a shorter time span than the five frame duration to build up the target audio decoder buffer delay at least as big as the audio decoder buffer delay of the primary channel at the splice time. The mechanism of this exemplary embodiment sets the target audio decoder buffer delay ¼ frame duration larger than the buffer delay of the primary channel at the splice time. It also maintains the buffer fullness as high as the initial fullness throughout the Ad so that, at the end of the Ad, the audio decoder buffer delay is big enough to splice back to the primary channel without altering the original audio decoder buffer fullness. The mechanism of this exemplary embodiment avoids repacketizing the audio packets yet still manages the decoder buffer fullness to avoid anomalies and it also maintains the original fullness of the primary channel after the Ad insertion to avoid accumulative error.

Referring to FIG. 4, the transport packets of the first five frames from the Ad server 104 are evenly spread out in the time period T (between $t_1$ and $t_2$, where $t_1$ is the transmission time of the last packet from the primary program; and $t_2$ is the transmission time of the first packet of the sixth frame from the Ad program) in accordance with this exemplary embodiment of the present invention.

The target audio decoder buffer delay $D_G$ is determined as follows:

$$D_G = D_L + \text{FrameDuration}/4;$$

$$\text{if } (D_G > 0.9 * \text{MAX\_AUD\_DEC\_BUFFER\_DELAY})$$

$$D_G = 0.9 * \text{MAX\_AUD\_DEC\_BUFFER\_DELAY};$$

where frameDuration is the duration of each frame (the time period between the two PTS of the consecutive frames). The MAX_AUD_DEC_BUFFER_DELAY is maximum decoder buffer delay of the advertisement audio stream. (It is equal to the ratio of the audio decoder buffer size and the advertisement audio bit rate).

The five frames of the Ad audio stream are chosen in this exemplary embodiment so that the splice processor 202 has enough time to acquire to the Ad audio stream, and, at the same time, it has enough time to build up the target audio decoder buffer delay without a sudden change of the audio decoder buffer fullness. Four consecutive frames are used to acquire the audio stream.

Because the target audio decoder buffer delay $D_G$ is approximately ¼ of frame duration larger than $D_L$, the time period T is approximately equal to 4¾ of frame duration. That means the first five frames are pulled out the delay buffer in 4¾ of frame time. The time period T may vary because of the audio decoder buffer fullness variation of the primary channel. If five frames are chosen, T is big enough to accommodate the variation without a sudden change of the audio decoder buffer fullness.

Throughout the Ad insertion process, the splice processor 202 maintains the target audio decoder buffer delay by setting the hardware tag of the first transport packet of each of a sixth through last frames. The hardware tag is used to determine the transmission time of each transport packet. The hardware tag of the first transport packet fpHwTag is set by the following equation:

$$fpHwTag = PTS - D_G$$

where PTS is the presentation time of the current frame. For the remainder of the transport packets of the current frame, the hardware tag hwTag is calculated by the following equation:

$$hwTag = fpHwTag + i * deltaTag$$

where i denotes the ith transport packet of the current frame; the deltaTag is calculated as follows:

$$deltaTag = \text{frameDuration}/(2*(\text{frameSize}/\text{packetPayloadSize}))$$

where frameSize is the size of each frame in bytes; and for MPEG-2 transport stream, packetPayloadSize is equal to 184. Because the deltaTag is set sufficiently small, the audio decoder buffer delay is big enough at the time the first packet of the next frame arrives. Therefore the first packet of the next frame's hardware tag may be set to fpHwTag to maintain the target audio decoder buffer delay. It is worth to notice that the first packet hardware time tag is set to fpHwTag every frame using the PTS of the current frame; because the PTS does not have accumulative error, the audio decoder buffer delay throughout the Ad will not have accumulative error; also after recovering from an error (such as a corrupted packet or momentary disconnection), the audio decoder buffer delay will be recovered to its target value by setting the first transport packet hardware time tag fpHwTag to the value of PTS−$D_G$ (audio decoder buffer delay is equal to PTS minus fpHwTag).

In accordance with this exemplary embodiment of the present invention, at the time to splice back to the primary channel, the audio decoder buffer delay is large enough to splice back to the primary channel without altering the original audio decoder buffer fullness. This feature will avoid accumulative error after the insertion. This is illustrated in FIG. 5, where the last Ad audio frame 318 is delayed by $D_G$, and the first primary audio packet 502, after the splice time, is delayed $D_L$, where $D_L < D_G$. This ensures that the audio decoder buffer delay is big enough to allow for the splice back of primary audio frames without the need for using the sbuffer 204. Further, in case of variation of the audio decoder buffer delay of the primary channel, a hwTagOffset is calculated and added to the hardware time tag of every transport packet from the primary channel. The hwTagOffset for the primary channel is calculated by the following:

$$\text{if } (D_L < D_G)$$

$$hwTagOffset = 0;$$

else $$hwTagOffset = D_L - D_G;$$

where $D_L$ denotes the audio decoder buffer delay of the first frame from the primary channel; $D_G$ denotes the audio decoder buffer delay of the last frame from the Ad server.

At the time to splice back to the primary channel, if the hwTagOffset is not equal to zero, accumulative error may occur. To avoid the accumulative error after the insertion, a target audio decoder buffer delay equal to $D_L$ is set. The hwTagOffset is then adjusted every frame using the following code:

$$\text{if } (D_f > D_L)$$

$$hwTagOffset += 300;$$

$$\text{else if } (D_f < D_L)$$

$$hwTagOffset -= 300;$$

where 300 is in 27 MHz ticks, and $D_f$ is the audio decoder buffer delay of the current frame.

The present system and method establishes the target audio decoder buffer delay at the time to splice into the Ad server. It also maintains the target audio decoder buffer delay throughout the Ad so that, at the end of the Ad, the audio decoder buffer fullness is high enough to accommodate the primary channel. This inventive technique avoids repacketizing the audio packets yet still manages the decoder buffer fullness to avoid anomalies and it also maintains the original fullness of the primary channel after the Ad insertion to avoid accumulative error. The mechanism is efficient, effective, and error resilient.

Although the invention has been described herein by reference to an exemplary embodiment thereof, it will be understood that such embodiment is susceptible of modification and variation without departing from the inventive concepts disclosed. For example, the above-described system and method may be applicable to video and other data streams in certain systems. All such modifications and variations, therefore, are intended to be encompassed within the spirit and scope of the appended claims.

We claim:

1. A system for splicing of a second transport stream into a first transport stream, said system comprising:

a splice processor, said splice processor receiving frames of first and second transport streams, and said splice processor also determining a target audio decoder buffer delay $$D_G=D_L+\text{FrameDuration}/4,$$

wherein $D_G$ is said target audio decoder buffer delay and $D_L$ is a frame delay of the first transport stream; and a splice delay buffer coupled to said splice processor, said splice delay buffer delaying transmission of a first five frames of said second transport stream until transmission of a last packet of said first transport stream prior to a splice time, in response to instructions from said splice processor.

2. The system of claim 1, wherein said splice processor assigns each of said first five frames of said second transport stream a hardware tag evenly across a time period from $t_1$ to $t_2$, wherein $t_1$ is the transmission time of the last packet from said first transport stream; and wherein $t_2$ is the transmission time of the first packet of the sixth frame from said second transport stream.

3. The system of claim 2, further comprising buffering and transmitting the first five frames of second transport stream from said splice delay buffer in a shorter time span T of 4¾ frame duration to build up a target decoder buffer delay.

4. The system of claim 1, wherein said splice processor assigns a first packet of each of said sixth through last frames of said second transport stream a hardware tag of $$fpHwTag=PTS-D_G,$$

wherein said PTS is the presentation time of the current frame;

said hardware tag containing a time of the first packet of each of said sixth through last frames will be transmitted from an audio delay buffer.

5. The system of claim 4, wherein said splice processor assigns the remaining packets of each of sixth through last frames of said second transport stream a hardware tag of $$hwTag=fpHwTag+n*deltaTag$$

where n denotes the nth transport packet of the current frame;

wherein fpHwTag is the hardware tag of the first packet of the current frame; and said deltaTag $$deltaTag=frameDuration/(2*(frameSize/packetPayloadSize))$$

said hardware tag containing a time of the remaining packets of each of said sixth through last frames will be transmitted from said audio delay buffer.

6. A method for splicing of a second transport stream into a first transport stream, said method comprising:

receiving frames of a first and second transport streams, wherein transmission of a first five frames of said second transport stream are delayed until transmission of a last frame of said first transport stream prior to a splice time, in response to instructions from a splice processor;

determining a target audio decoder buffer delay $$D_G=D_L+\text{FrameDuration}/4,$$

wherein $D_G$ is said target audio decoder buffer delay and $D_L$ is a frame delay of the first transport stream.

7. The method of claim 6, further comprising assigning each of said first five frames of said second transport stream a hardware tag evenly across a time period from $t_1$ to $t_2$, wherein $t_1$ is the transmission time of the last packet from said first transport stream; and $t_2$ is the transmission time of the first packet of the sixth frame from said second transport stream.

8. The method of claim 7 further comprising buffering and transmitting said first five frames of said second transport stream from a splice delay buffer in a shorter time span T of 4¾ frame time to build up a target decoder buffer delay without a sudden change of the decoder buffer fullness.

9. The method of claim 6, further comprising assigning the first packet of each of said a sixth through last frames of said second transport stream a hardware tag of $$fpHwTag=PTS-D_G,$$

wherein PTS is the presentation time of the current frame, said hardware tag containing a time of said first packet of each of said a sixth through last frames will be transmitted from an audio delay buffer.

10. The system of claim 6, further comprising assigning the remaining packets of each of a sixth through last frames of said second transport stream a hardware tag of $$hwTag=fpHwTag+n*deltaTag$$

wherein n denotes the nth transport packet of the current frame; wherein fpHwTag is the hardware tag of the first packet of the current frame; and wherein said deltaTag $$deltaTag=frameDuration/(2*(frameSize/packetPayloadSize))$$

said hardware tag containing a time of the remaining packets of each of said sixth through last frames will be transmitted from an audio delay buffer.

11. A computer-readable medium for storing computer program instructions for splicing of a second transport stream into a first transport stream that instruct a computer to perform the steps of:

receiving frames of a first and second transport streams, wherein transmission of a first five frames of said second transport stream are delayed until transmission of a last frame of said first transport stream prior to a splice time, in response to instructions from a splice processor determining a target audio decoder buffer delay $$D_G=D_L+\text{FrameDuration}/4,$$

wherein $D_G$ is said target audio decoder buffer delay and $D_L$ is a frame delay of the first transport stream.

12. The computer-readable medium for storing computer program instructions of claim 11, further comprising assigning each of said first five frames of said second transport stream a hardware tag evenly across a time period from $t_1$ to $t_2$, wherein $t_1$ is the transmission time of the last packet from said first transport stream; and $t_2$ is the transmission time of the first packet of the sixth frame from said first transport stream.

13. The computer-readable medium for storing computer program instructions of claim 12 further comprising buffering and transmitting said first five frames of second transport stream from a splice delay buffer in a shorter time span T of 4¾ frame time to build up a target decoder buffer delay without a sudden change of the decoder buffer fullness.

14. The computer-readable medium for storing computer program instructions of claim 11, further comprising the step of assigning the first packet of each of said sixth through last frames of said second transport stream a hardware tag of $$fpHwTag=PTS-D_G,$$

wherein PTS is the presentation time of the current frame;

said hardware tag containing a time of the first packet of each of said sixth through last frames will be transmitted from an audio delay buffer.

15. The computer-readable medium for storing computer program instructions of claim 11, further comprising the step of assigning the remaining packets of each of sixth through last frames of said second transport stream a hardware tag of $$hwTag = fpHwTag + n*deltaTag$$

wherein n denotes the nth transport packet of the current frame; wherein fpHwTag is the hardware tag of the first packet of the current frame; and said deltaTag $$deltaTag = frameDuration/(2*(frameSize/packetPayloadSize))$$

said hardware tag containing a time of the remaining packets of each of said sixth through last frames will be transmitted from an audio delay buffer.

* * * * *